Dec. 31, 1963  C. E. GRAWEY ETAL  3,116,198
METHOD OF SEALING CONTACTING SURFACES AND ARTICLE
OF MANUFACTURE PRODUCED THEREBY
Filed May 31, 1960
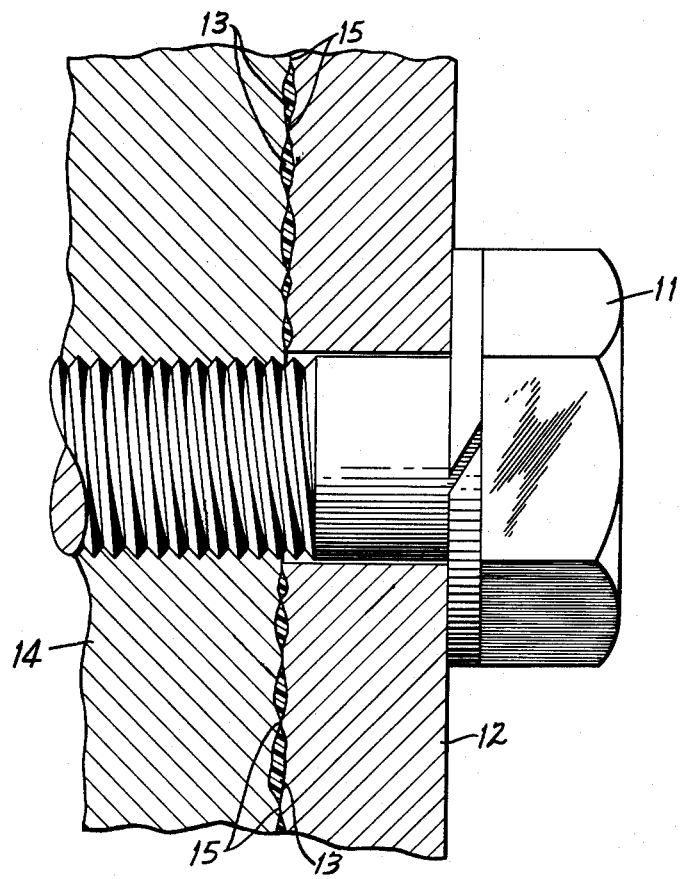
INVENTORS
CHARLES E. GRAWEY
ROBERT W. UNTZ
BY
Fryer and Zimvold
ATTORNEYS 3,116,198
METHOD OF SEALING CONTACTING SURFACES, AND ARTICLE OF MANUFACTURE PRODUCED THEREBY
Charles E. Grawey, Peoria, and Robert W. Untz, Hanna City, Ill., assignors to Caterpillar Tractor Co., Peoria, Ill., a corporation of California
Filed May 31, 1960, Ser. No. 32,980
4 Claims. (Cl. 161—217)

The present invention relates to a non-adhesive paste sealant and to its use in sealing mated solid surfaces. More specifically the present invention is concerned with a novel paste sealant composition having outstanding utility as a substitute for soft preformed gaskets employed to seal flanges and covers in areas not subject to extremely high pressures and temperatures. The present invention also encompasses the novel combination of paste sealant and mated metal surfaces which manifests a very high resistance to vibration and is not subject to gasket relaxation.

In the past solid compressible gaskets have been used for sealing flanges and covers in machinery of all types. Such gaskets have been found undesirable, however, because they cannot be stocked in the multitude of sizes and shapes needed. Moreover in gear boxes and the like it is necessary to determine the compressed dimension of the gasket. Additionally compressible gaskets tend to relax thus releasing tension on the securing bolts which are then subject to vibration.

Because of these and other shortcomings of solid compressible gaskets, liquid adhesive type sealants have been used with increasing frequency. Though these sealants show more flexibility particularly when used to mate irregular solid surfaces, their adhesive properties present a very serious problem when disassembly of the mated parts is attempted.

It is consequently the principal object of the present invention to provide a non-adhesive sealant paste which effectively seals but does not bond solid elements.

Still another object of the present invention is to provide an efficient and economical method for the preparation of seals which are highly resistant to vibration.

Other objects, features and advantages of the present invention will be apparent from the following description read in conjunction with the appended claims. This invention is particularly useful for sealing adjoining metal to metal parts, but it may also be employed to seal any adjacent contacting solid surfaces including those made of synthetic resins.

The novel sealing paste of the present invention comprises a copolymer, an organic solvent therefor, and an anti-oxidant in sufficient quantity to prevent the copolymer from oxidizing when the composition is applied to solid surfaces.

The copolymer particularly contemplated by the present invention is the linear copolymer of acrylonitrile and butadiene. Particularly contemplated are copolymers of acrylonitrile and butadiene wherein the acrylonitrile constitutes from approximately 15 to 45 parts per 100 parts of copolymer by weight. A lower percentage of acrylonitrile in the copolymer is generally preferred since it enables the product to manifest greater flexibility and swelling properties. It will be understood, however, that percentages of acrylonitrile both below 15% and above 45% by weight may be employed for the purposes of the present invention, and from about 5% to 55% by weight acrylonitrile may be used. The commercially sold product satisfactorily used for the purposes of the present invention is Paracril AJ. This product contains in the order of 15% to 18% acrylonitrile by weight.

The present invention encompasses broadly the employment of any organic solvent effective in dissolving the copolymer. Acetone, methylethylketone and blends of aromatic solvents have all been used successfully with the copolymers of acrylonitrile and butadiene. It will be readily understood that other known solvents may also be used for the purposes of the present invention and that the solvents may be employed alone or in combination. Of the various solvents used those of high volatility such as acetone are preferred since in application the solvent is allowed to evaporate after the paste is applied and before the metallic surfaces are joined.

The organic solvent serves to maintain the sealant in a semi-liquid state during application to the metallic surfaces to be mated.

The amount of solvent employed may vary considerably without departing from the scope of the invention. As a practical matter however, the consistency of the paste can effect the ease of application to the surfaces of metals to be mated. Broadly considered then the solids content of the paste can range from an extrudable viscosity to a sprayable viscosity. A range of 5% to 35% solids in the paste is clearly contemplated by the present invention. A range of approximately 20% solid appears preferable from the standpoint of ease of handling.

The sealant paste of the present invention must contain an anti-oxidant to prevent oxidation, i.e., alteration of the chain length of the copolymer, after it has formed a paste with the organic solvent. The presence of an effective quantity of anti-oxidant in the paste is critical for the purposes of the present invention. Without anti-oxidant the chain length of the copolymer would shorten resulting in an undesirably mobile composition, or lengthen resulting in undesirable hardening of the sealant. Of the anti-oxidants that may be employed arylamine anti-oxidants such as phenyl-beta-naphthylamine, diphenyl-p-phenylenediamine and aldol-alpha-naphthylamine are preferred. The invention is not restricted to arylamines, however, since other anti-oxidants such as hydroquinone, mono-benzyl ether and certain petroleum waxes have also been found effective as have mixtures of the above enumerated anti-oxidants. Phenyl-beta-naphthylamine is most preferred because it appears superior in maintaining flexibility and in resisting aging of the composition. The quantity of anti-oxidant in the composition can range from approximately .5% to 5% by weight of the polymer. Approximately 2% by weight is preferred. Above a concentration of 5% no significant increase in anti-oxidation activity is discernible; below .5% the anti-oxidant does not appear significantly effective.

The critical presence of an effective quantity of anti-oxidant and the omission of any agent causing adhesion clearly distinguishes the present sealing composition from those of the art. In the past the presence of adhesive properties was considered a necessary attribute of a sealant composition. Hence, the present sealing composition constitutes a clear departure from the art.

In one specific example of the sealing paste of the present invention 100 parts by weight acrylonitrile-butadiene copolymer sold under the name Paracril AJ rubber was mixed with 2 parts by weight N-phenyl-beta-naphthylamine and 10 parts by weight red pigment. This mixture was dissolved in commercial grade acetone. Extensive experimentation has shown that a solution containing approximately 15% to 20% by weight solids is optimum for brushing metallic surfaces. If desired, however, more solvent may be added for spraying or rolling. When extruded the solids content is altered to meet the requirements of the extruder.

In another example 100 parts by weight acrylonitrile-butadiene copolymer sold under the name Hycar 1001 (this contains approximately 40% acrylonitrile by weight) was mixed with 2 parts by weight N-phenyl-beta-naphthylamine and 10 parts by weight red pigment. This mixture was similarly dissolved in acetone and also proved highly effective as a metal to metal sealant.

The unique metal to metal contact of the present invention is schematically shown in the drawing which is a fragmentary sectional view of an article of manufacture comprising two metal surfaces sealed by the described paste. In the drawing, 12 and 14 represent metal members and 15 represents a point of contact between these elements. Metal members 12 and 14 may be rigid flanges on the final drive housings of a tractor, the side cover plates on an engine, the cover of a magneto or other appropriate mated metal elements to be joined.

Disposed between metal members 12 and 14, paste 13 serves to seal the metal surfaces in near metal to metal contact. Metal members 12 and 14 are held together by any suitable means such as a bolt 11. This bolt supplies the force necessary to extrude the excess paste resulting in a final thickness as indicated by reference character 13. In the case of rough metal elements the metal surfaces may in fact touch as indicated at 15 in the drawing. In application the paste 13 may vary greatly in thickness with individual application. In most situations a thickness of not less than .1 mil or greater than 10 mils is satisfactory. A thickness of 1 to 3 mils is most common though it will be understood that the invention is not restricted to this range.

Because the sealant 13 is a paste rather than a solid gasket it is particularly effective in sealing irregularly shaped mating surface. Moreover, the use of the claimed sealant paste eliminates the necessity for extreme tolerance in gaskets. Most important is the fact that sealant 13 is not adhesive and therefore does not interfere with disassembly of the metal members. Disassembly was heretofore rendered difficult by the adhesive liquid sealants commonly used. Sealant 13 is particularly unique in that it maintains a highly effective seal at temperatures up to 300° F. and internal pressures up to 40 p.s.i. whereas it was heretofore considered necessary to employ an adhesive liquid sealant to effect a good seal.

Another important advantage of the described article of manufacture is its high resistance to vibration. Thus, experimentation has shown that a bolt illustrated schematically at 11 is not loosened by vibration. In the past solid gaskets have been found to relax thus releasing the tension on the bolts securing the parts and causing the assembly to loosen from vibration. This problem is obviated by the present invention.

Extensive vehicle tests have shown the superiority of the present sealing composition to conventional gaskets in a multitude of uses. The claimed liquid sealant paste has been particularly evaluated for durability and ease of replacement in attaching bottom plates to the bottoms of cylinder blocks, oil pans to bottom plates, fly wheel housings to the rear of cylinder blocks, water outlet elbows to cylinder heads, fuel transfer pumps to accessory driving houses, etc. In all tests conducted, the claimed sealant paste has proved to be, in one or more ways, unequivocally superior to conventional gaskets heretofore used.

In application it is preferred that the mating metal surfaces first be wiped with a clean shop towel. It is not necessary, however, that all oil be removed from the metal surfaces. In fact, a limited quantity of oil on the mated surfaces has on occasion proved helpful. In contradistinction to the present method, all oil must be removed from mating surfaces sealed with conventional adhesive sealant paste. The paste may be sprayed when facilities permit, brushed, rolled or extruded on the mating surfaces. It has been found preferable to apply the paste to both surfaces though a thorough application to one surface is acceptable. Whenever possible pigment such as Croma Red is added to the paste composition to assist the operator in ascertaining the proper quantity of paste. Broadly considered sufficient sealant paste is present when the flange or other mating surface is hidden from view by the dye. It is most important that sufficient time elapse before mating the coated metal elements so that the solvent may completely evaporate. The amount of time required will, of course, vary considerably with the conditions of individual application. Spraying has been found to generally require two minutes or more. Brush applications, on the other hand, necessitate five minutes or more for complete evaporation of the solvent. In the case of rolled and extruded applications the amount of time required for solvent evaporation varies even more widely. At any time after solvent evaporation, the mating surfaces can be joined to form the novel article of manufacture as shown in the drawing.

We claim:

1. As an article of manufacture, a plurality of metal members having disposed therebetween a non-adhesive, solvent-free deposit of a non-cured sealing paste consisting essentially of an unvulcanized mixture of:
   (a) an acrylonitrile-butadiene copolymer having from about 15 parts to about 45 parts acrylonitrile per 100 parts copolymer by weight,
   (b) a volatile organic solvent for said copolymer, and
   (c) approximately 0.5% to 5% by weight of an anti-oxidant, based upon the weight of said copolymer,
   the solid content of said mixture ranging between approximately 5% and 35% by weight, said solvent-free deposit of said mixture:
   (a) causing substantially no bonding together of the surfaces of said members between which said deposit is disposed, and
   (b) serving as a seal between said surfaces which remains substantially unaffected by vibration of said members.

2. As an article of manufacture, two metal members having disposed therebetween a non-adhesive, solvent-free deposit of a non-cured sealing paste consisting essentially of an unvulcanized mixture of:
   (a) an acrylonitrile-butadiene copolymer having from about 15 parts to about 45 parts acrylonitrile per 100 parts copolymer by weight,
   (b) a volatile organic solvent for said copolymer and
   (c) approximate 0.5 % to 5% by weight of an anti-oxidant, based upon the weight of said copolymer,
   the solid content of said mixture ranging between approximately 5% and 35% by weight, said solvent-free deposit of said mixture:
   (a) causing substantially no bonding together of the surfaces of said members between which said deposit is disposed, and
   (b) serving as a seal between said surfaces which remains substantially unaffected by vibration of said members.

3. An article of manufacture as defined in claim 1, wherein said anti-oxidant is an arylamine.

4. An article of manufacture as defined in claim 3, wherein said arylamine is phenyl-beta-naphthylamine.

References Cited in the file of this patent

UNITED STATES PATENTS

| | | |
|---|---|---|
| 2,340,699 | Sarbach | Feb. 1, 1944 |
| 2,560,033 | Nanfeldt | July 10, 1951 |
| 2,615,820 | Schwoegler | Oct. 28, 1952 |
| 2,711,380 | Pintell | June 21, 1955 |
| 2,879,252 | Been et al. | Mar. 29, 1959 |
| 2,961,290 | Kolb | Nov. 22, 1960 |

OTHER REFERENCES

Whitley: "Synthetic Rubber," Wiley and Sons, New York (1954), pages 816–817.